United States Patent [19] [11] 3,748,368
Lin et al. [45] July 24, 1973

[54] ELECTRICAL BUSHING ASSEMBLY
[75] Inventors: Kou Chi Lin, Sharon; LeRoy E. Dobson, Jamestown, both of Pa.
[73] Assignee: Westinghouse Electric Corporation, Pittsburgh, Pa.
[22] Filed: Sept. 25, 1972
[21] Appl. No.: 292,241

[52] U.S. Cl............................ 174/12 BH, 174/31 R
[51] Int. Cl. .......................................... H01b 17/26
[58] Field of Search ................... 174/11 BH, 12 BH, 174/14 BH, 15 BH, 16 BH, 18, 31 R, 75 R, 75 D, 75 F, 142, 143, 152 R, 153 R, 167

[56] References Cited
UNITED STATES PATENTS
1,915,743   6/1933   Meerbeck ......................... 174/21 R
2,499,769   3/1950   Middleton, Jr. .......... 174/12 BH UX
3,118,966   1/1964   Yeckley et al. ................ 174/31 R X
3,597,521   8/1971   Tragesser ....................... 174/12 BH FOREIGN PATENTS OR APPLICATIONS
249,953   6/1948   Switzerland ...................... 174/31 R Primary Examiner—Laramie E. Askin
Attorney—A. T. Stratton and F. E. Browder

[57] ABSTRACT

Electrical bushing assembly having a cap nut, an expansion cap, a condenser tube, and a lower support nut all constructed of an aluminum material. The ends of the condenser tube are beveled and are welded to lips located on the cap and support nuts. The expansion cap is welded to a lip around the outside of the cap nut. Grooves around the lips divert the direct conduction of welding heat to plated or coated surfaces on the cap and support nuts. The welding heat required is relatively small due to the thinness of the lips.

8 Claims, 3 Drawing Figures

PATENTED JUL 24 1973

3,748,368

ELECTRICAL BUSHING ASSEMBLY

BACKGROUND OF THE INVENTION

1. Field of the Invention

This invention relates, in general, to electrical bushing assemblies and, more specifically, to electrical bushing assemblies constructed of aluminum components.

2. Description of the Prior Art

The size of electrical bushings generally must be increased to raise the rating of the bushing. The size of bushings required to provide the proper electrical characteristics in extra high voltage systems presents mechanical problems due to the weight and size of the bushing.

Ordinarily, large bushings have major components thereof constructed of copper due to its excellent electrical properties. However, the weight and cost of copper components make the use thereof undesirable in some large bushings.

Bushing components constructed of aluminum provide adequate electrical characteristics and reduce the cost and weight of the bushing. However, since aluminum components cannot satisfactorily be soldered or brazed similarly to copper, making satisfactory joints between aluminum components presents a major problem in the use of aluminum materials in electrical bushing assemblies.

It is difficult to weld thin aluminum components to thick aluminum components because of the difference in welding heats required for each component. In such cases, maintaining the proper heat is critical, otherwise the thinner component may be melted. It is necessary to plate or coat the aluminum components, which provide electrical contact, with the material which does not oxidize readily. Otherwise, the aluminum surface would oxidize and retard the passage of electrical current. With plated components, it is necessary to maintain as low a welding heat as practical to prevent burning of the thinly plated material.

Occasionally, bushings must be disassembled. With soldered copper components, disassembly is aided by the fact that the solder can be heated and melted easily without damage to the bushing components. When aluminum components are welded together, heating of the welding material to separate the components damages the aluminum components.

Therefore, it is desirable, and it is an object of this invention, to provide an electrical bushing wherein components thereof can be constructed of aluminum and welded together without the need for excessive welding heat. It is also desirable, and it is another object of this invention, to provide an electrical bushing wherein the aluminum bushing components may be disassembled without damage to the bushing components.

SUMMARY OF THE INVENTION

There is disclosed herein new and useful electrical bushing apparatus having major components thereof constructed of an aluminum material. An aluminum condenser tube is threadably engaged with a cap nut at the top of the bushing. The cap nut contains a circular groove and a circular lip near the end of the condenser tube. A gas tight seal between the cap nut and the condenser tube is provided by welding the upper end of the condenser tube to the adjacent lip. The end of the condenser tube is beveled to reduce the thickness of the tube at the welding location. Use of the lip permits welding with less heat than would be required normally. A groove located adjacent to the lip requires a longer conduction path than normal between the welded area and the plated upper surface of the cap nut. Thus, destruction of the plated surface by excessive heat is reduced by the groove. Similar lip and groove arrangements are used wherein an aluminum expansion cap is welded to the cap nut and wherein the condenser tube is welded to an aluminum support nut.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
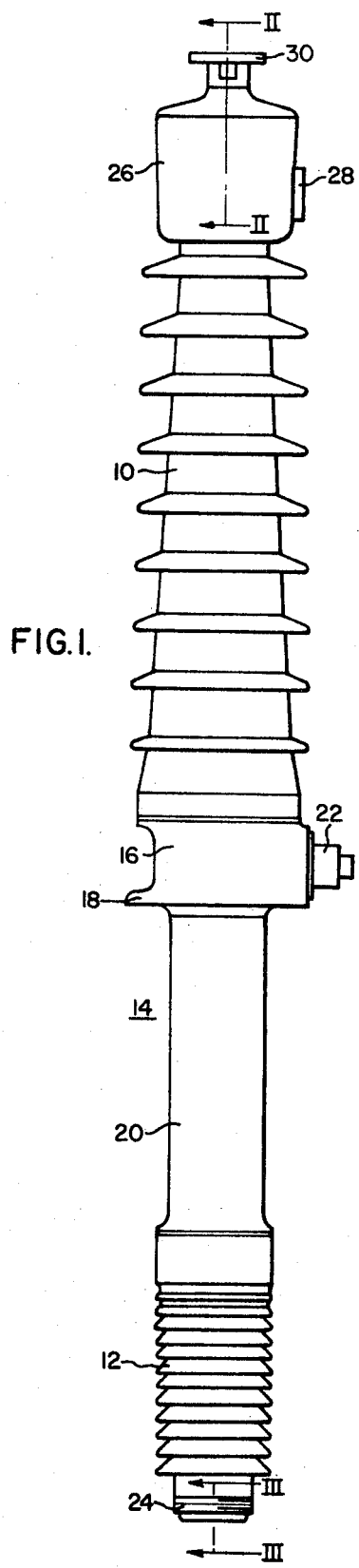
FIG. 1 is an elevational view of an electrical bushing assembly constructed according to this invention.

Throughout the following description, similar reference characters refer to similar members in all figures of the drawing.

Referring now to the drawing, and FIG. 1 in particular, there is shown an elevational view of an electrical bushing assembly constructed according to this invention. The bushing includes the insulators 10 and 12 which may be constructed of porcelain, epoxy, or any other suitable material. The flange assembly 14 provides supporting means for attaching the bushing to its associated electrical apparatus, such as a power transformer. The flange assembly 14 includes an upper extension 16, a flange 18, and a lower extension 20. The upper extension 16 includes the condenser tap terminal 22. The flange 18 is adapted for attachment to the enclosure of the associated electrical apparatus. The lower extension 20 provides a mounting region for current transformers. The insulators 10 and 12 and the flange assembly 14 contain longitudinal openings through which a condenser tube, which is not illustrated in FIG. 1, extends.

The bottom of the bushing includes a support nut 24 which is attached to the condenser tube. The top of the bushing includes an expansion chamber 26 with an oil level gauge 28 attached thereto. A cap nut 30 is attached to the expansion chamber 26 and provides means for connecting the bushing to other electrical components or circuits.

Figure 2:
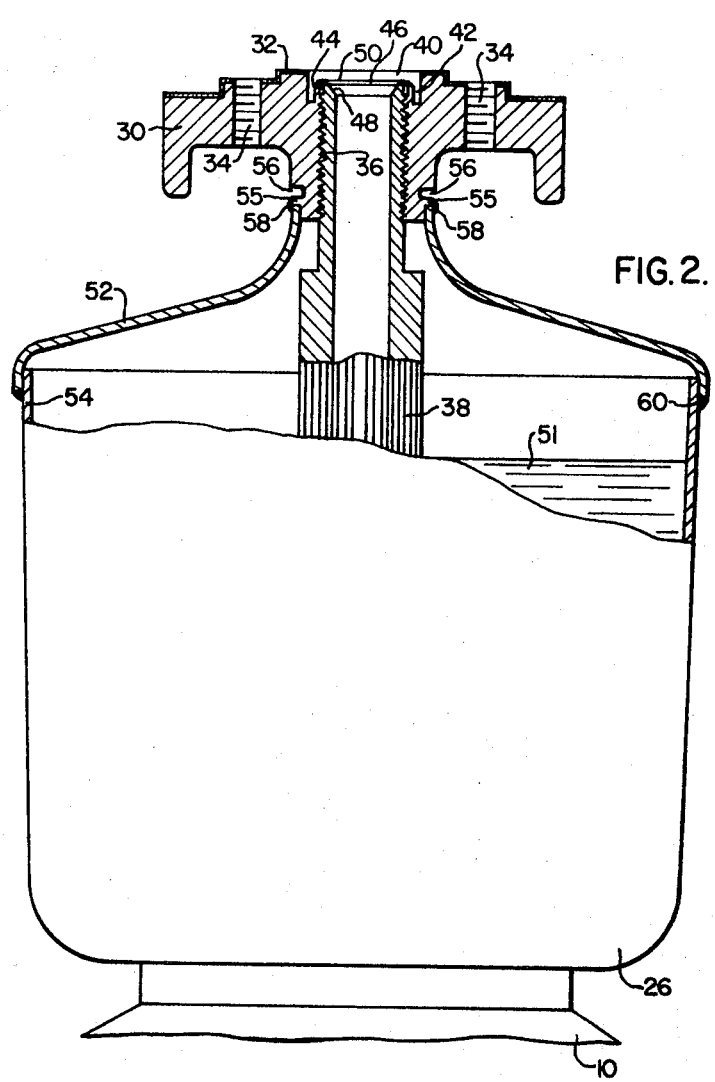
FIG. 2 is a view taken partly in section along the line II—II of FIG. 1.

FIG. 2 illustrates the construction details of the expansion chamber 26 and the cap nut 30. The cap nut is constructed of aluminum, that is, an aluminum alloy having suitable properties. The cap nut 30 is plated or coated with a material 32, such as tin, to prevent oxidation of the aluminum. Threaded holes 34 facilitate connection of the electric circuit to the cap nut 30.

The cap nut 30 contains a threaded opening 36 which extends through the cap nut 30 and is engaged with threads on a condenser tube 38. The threads at the upper end of the opening 36 and the condenser tube 38 may be removed, as shown in FIG. 2, to facilitate disassembly of the components. The cap nut 30 also contains a circular cavity 40 having a circular groove 42 extending around the axis of the condenser tube 38. A circular projecting lip 44 of relatively small thickness is bounded on one side by the groove 42 and on the other side by the wall of the opening 36. The condenser tube 38 is constructed of a suitable aluminum material and has its upper end 46 positioned at the top of the lip 44. The upper portion 48 of the condenser tube 38 is beveled.

The unique construction described herein allows the welding material 50 to be deposited across the junction of the condenser tube 38 and the cap nut 30 with a minimum of heat. The beveled end 46 of the condenser tube 38 reduces the amount of condenser tube material at the weld junction. The lip 44 is constructed to provide only enough cap nut material at the weld junction to provide a sufficient welding surface. Since the amount of material being welded is small and substantially equal at the welding junction, a minimum amount of heat is required. Therefore, destruction of the plated material 32 is reduced. Furthermore, the groove 42 requires that heat transferred from the weld junction to the top of the cap nut 30 travel around the groove 42. Thus, less heat is conducted to the top of the cap nut 30 than would be without the groove 42. When disassembly of the bushing is desired, the welding material 50 may be cut from the junction of the cap nut 30 and the condenser tube 38 with a suitable tool, thus allowing their separation.

The expansion chamber 26 permits expansion and contraction of oil 51 sealed within the bushing. The expansion chamber 26 includes the expansion cap 52 and the expansion bowl 54 which are constructed of aluminum. The expansion cap 52 is positioned against a circular lip 55 which is defined on one side by a groove 56. Welding material 58 is deposited across the junction of the expansion cap 52 and the cap nut 30. The lip 55 and the groove 56 perform the same function as the lip 44 and the groove 42 in reducing heat conduction to the plated surfaces and in reducing the required welding heat. The expansion cap 52 and the expansion bowl 54 are secured together by the welding material 60.

Figure 3:
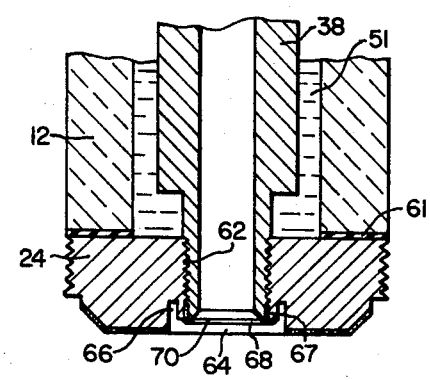
FIG. 3 is a sectional view taken along the line III—III of FIG. 1.

FIG. 3 illustrates the construction details of the insulator support nut 24. A gasket 61 is positioned between the insulator 12 and the support nut 24 to seal the oil 51 within the bushing. The support nut 24 contains a threaded opening 62 which extends through the support nut 24 and which is engaged with threads on the condenser tube 38. The support nut 24 also contains a circular cavity 64 with a circular groove 66 located in the cavity 64 and extending around the axis of the condenser tube 38. A circular projecting lip 67 of relatively small thickness is bounded on one side by the groove 66 and on the other side by the wall of the opening 62.

The support nut 24 and the condenser tube 38 are constructed of aluminum and welded together by the welding material 68 on the beveled lower end 70 of the condenser tube 38 and the lip 67. The circular lip 67 and the groove 66 aid the welding process and reduce plating destruction as discussed concerning FIG. 2.

By using the novel construction arrangements disclosed herein, use of aluminum components in large electrical bushings is made practical. Since numerous changes may be made in the above-descibed apparatus and different embodiments of the invention may be made without departing from the spirit thereof, it is intended that all of the matter contained in the foregoing description, or shown in the accompanying drawings, shall be interpreted as illustrative rather than limiting.

We claim as our invention:

1. An electrical bushing assembly comprising insulating means and supporting means having longitudinal openings therethrough, a longitudinal condenser tube positioned in said longitudinal openings and having upper and lower ends with threads located substantially adjacent to said ends, a cap nut having a threaded opening extending therethrough which is engaged with the threaded portion adjacent to the upper end of said condenser tube, said cap nut having a conducting face positioned above the upper end of said condenser tube with a circular cavity extending therein, said cap nut including a first circular groove located in said cavity and extending around the axis of said condenser tube, a first circular projecting lip located in said cavity and extending around the axis of said condenser tube, and welding material disposed across the junction of said circular projecting lip and the upper end of said condenser tube.

2. The electrical bushing assembly of claim 1 wherein the cap nut includes a second circular groove and a second circular projecting lip located around the outside of the cap nut, and wherein the bushing assembly includes an expansion cap positioned against said second circular projecting lip with welding material disposed across the junction of said second circular projecting lip and said expansion cap.

3. The electrical bushing assembly of claim 2 wherein the condenser tube, the cap nut, and the expansion cap are constructed of aluminum.

4. The electrical bushing assembly of claim 1 wherein an electrical conducting material is disposed on the cap nut and the upper end of the condenser tube is beveled.

5. An electrical bushing assembly comprising insulating means and supporting means having longitudinal openings therethough, a longitudinal condenser tube positioned in said longitudinal openings and having upper and lower ends with threads located substantially adjacent to said ends, a support nut having a threaded opening extending therethrough which is engaged with the threaded portion adjacent to the lower end of said condenser tube, said support nut having a bottom face with a circular cavity extending therein, said support nut including a groove located in said cavity and extending around the axis of said condenser tube, a circular projecting lip located in said cavity and extending around the axis of said condenser tube, and welding material disposed across the junction of said circular projecting lip and the lower end of said condenser tube.

6. The electrical bushing assembly of claim 5 wherein the condenser tube and the support nut are constructed of aluminum.

7. The electrical bushing assembly of claim 5 wherein an electrical conducting material is disposed on the support nut and the lower end of the condenser tube is beveled.

8. An electrical bushing assembly comprising insulating means and supporting means having longitudinal openings therethrough, a longitudinal condenser tube constructed of aluminum and positioned in said longitudinal openings, said condenser tube having upper and lower ends with threads located substantially adjacent to said ends, a cap nut constructed of aluminum with a conductive material disposed thereon, said cap nut having a threaded opening extending therethrough which is engaged with the threaded portion adjacent to the upper end of said condenser tube, said cap nut having a conducting face positioned above the upper end of said condenser tube with a circular cavity extending therein, said cap nut including a first circular groove located in said cavity and extending around the axis of said condenser tube, a first circular projecting lip located in said cavity and extending around the axis of said condenser tube, welding material disposed across the junction of said first circular projecting lip and the upper end of said condenser tube, said cap nut including a second circular groove and a second circular projecting lip located around the outside of said cap nut, an expansion cap constructed of aluminum and positioned against said second circular projecting lip, welding material disposed across the junction of said second circular projecting lip and said expansion cap, a support nut constructed of aluminum and having a threaded opening therethrough which is engaged with the threaded portion adjacent to the lower end of said condenser tube, said support nut having a bottom face with a circular cavity extending therein with a third circular groove located in said cavity and extending around the axis of said condenser tube, a third circular projecting lip located in said cavity and extending around the axis of said consenser tube, and welding material disposed across the junction of said third circular projecting lip and the lower end of said condenser tube, said upper and lower ends of said condenser tube being beveled.

* * * * *